Patented Oct. 6, 1953

2,654,783

UNITED STATES PATENT OFFICE 2,654,783

PROCESS FOR THE MANUFACTURE OF OCTAALKYLPYROPHOSPHORAMIDES

Henry Tolkmith, Midland, Mich., assignor to The Dow Chemical Company, Midland, Mich., a corporation of Delaware No Drawing. Application August 17, 1951, Serial No. 242,404

9 Claims. (Cl. 260—545)

1

The present invention is concerned with a novel process for the manufacture of pyrophosphoramides of the formula

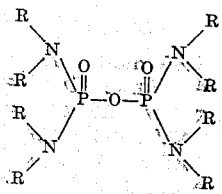

In the above and succeeding formula, R represents an alkyl radical containing from 1 to 4 carbon atoms, inclusive.

The new process comprises subjecting a bis(tetraalkyldiamidophosphoric) dialkylamidophosphoric dianhydride of the formula

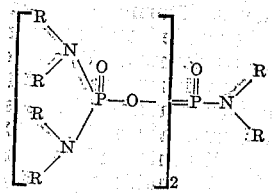

to a temperature greater than 135° C. while admixed with a hexaalkylphosphoramide of the formula

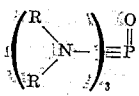

The exact mechanics of the reaction are not completely understood. Some octaalkylpyrophosphoramide is produced under the described reaction conditions regardless of the proportions of hexaalkylphosphoramide and bis(tetraalkyldiamidophosphoric) dialkylamidophosphoric dianhydride present in the reaction mixture. In preferred practice, increased yields of the desired compound are obtained when at least one molecular proportion of the hexaalkylphosphoramide is employed with each molecular proportion of the dianhydride. Best results are obtained when an excess of up to six molecular proportions of the hexaalkylphosphoramide is reacted with each molecular proportion of the bis(tetraalkyldiamidophosphoric) dialkylamidophosphoric dianhydride.

The production of the octaalkylpyrophosphoramides has been found to take place at a temperature greater than 135° C. Since the desired products have a tendency to decompose at temperatures in excess of 190° C., exposure to such elevated temperatures for any appreciable period of time should be avoided.

2

The rate at which the formation of the pyrophosphoramides takes place has been found to vary directly with the temperature employed. In the practice of the method of the invention, the heating is generally carried out over a period of from two to twelve hours or longer, the longer periods of reaction being employed at the lower temperatures.

In carrying out the process of the present invention, the total reactant charge may be mechanically mixed and then heated for a period of time. Alternatively, the bis(tetraalkyldiamidophosphoric) dialkylamidophosphoric dianhydride may be added portionwise to the hexaalkylphosphoramide under conditions of elevated temperature in the reaction vessel. Upon completion of the reaction, low boiling constituents may be stripped from the reaction mixture by distillation under reduced pressure, and preferably under 190° C.

The crude reaction products as obtained in the practice of the present method may be employed in parasiticidal compositions without purification or separation. If desired, however, the octaalkylpyrophosphoramide may be separated from the reaction product by molecular distillation.

The bis(tetraalkyldiamidophosphoric) dialkylamidophosphoric dianhydrides employed as starting materials in the aforedescribed process may be produced by the method disclosed in my copending application Serial No. 242,406 filed concurrently herewith. The process comprises reacting together at a temperature of from 90° to 135° C. at least two molecular proportions of a diamido compound of the formula

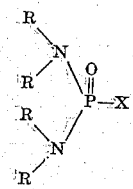

and one molecular proportion of a monoamido compound of the formula

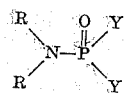

wherein X is a member of the group consisting of chlorine and R'—O— and Y is the other member of said group, and R' is an alkyl radical containing from 1 to 4 carbon atoms, inclusive. The reaction involves a condensation resulting in the formation of alkyl chloride. In practice, substantially all the chlorine in the tetraalkyldiamidophosphoric chloride or the dialkylamidophosphoric dichloride may be recovered as alkyl chloride (R'Cl).

In carrying out the reaction, the tetraalkyldiamido phosphoric chloride and the O,O-dialkyl dialkylamidophosphate or the O-alkyl tetraalkyldiamidophosphate and dialkylamidophosphoric dichloride re mixed together and the resulting dispersion heated with stirring at a temperature of from 90° to 135° C. until no substantial amounts of alkyl chloride of reaction are liberated. Upon completion of the reaction, the mixture may be distilled under reduced pressure and under 135° C. to separate low boiling constituents and to obtain as a residue the desired bis(tetraalkyldiamidophosphoric) dialkylamidophosphoric dianhydride.

In carrying out the method of the present invention, it has been found unnecessary to isolate the bis(tetraalkyldiamidophosphoric) dialkylamidophosphoric dianhydrides to be employed as starting materials. Thus, the new process may be carried out by subjecting either set of the precursors of the bis(tetraalkyldiamidophosphoric) dialkylamidophosphoric dianhydrides to a temperature greater than 135° C. while admixed with a suitable hexaalkylphosphoramide.

According to the latter procedure, a suitable tetraalkyldiamidophosphoric chloride and O,O-dialkyl dialkylamidophosphate are heated at a temperature greater than 135° C. while admixed with a suitable hexaalkylphosphoramide. Alternatively, the process may be carried out by subjecting a suitable O-alkyl tetraalkyldiamidophosphate and dialkylamidophosphoric dichloride to a temperature greater than 135° C. while admixed with an appropriate hexaalkylphosphoramide. By-product alkyl chloride is formed when either set of the precursors of the bis(tetraalkyldiamidophosphoric) dialkylamidophosphoric dianhydride is employed in the reaction mixture. In practice, substantially all of the chlorine in the tetraalkyldiamidophosphoric chloride or the dialkylamidophosphoric dichloride may be recovered as alkyl chloride.

In the practice of this further modification of the invention, at least one molecular proportion of the hexaalkylphosphoramide is employed with an amount of the precursors of the bis(tetraalkyldiamidophosphoric) dialkylamidophosphoric dianhydride to produce one molecular proportion of the latter phosphate compound. For example, at least one mole of the hexaalkylphosphoramide is employed with each 2 or more moles of the tetraalkyldiamidophosphoric chloride and one mole of the O,O-dialkyl dialkyldiamidophosphate, or with each 2 or more moles of the O-alkyl tetraalkyldiamidophosphate and one mole of the dialkylamidophosphoric dichloride. As has been previously described, increased yields are obtained when a considerable excess of the hexaalkylphosphoramide is employed.

When the precursors of the bis(tetraalkyldiamidophosphoric) dialkylamidophosphoric dianhydrides are employed in the reaction mixture, the formation of the octaalkylpyrophosphoramides has been found to take place at a rate which varies directly with the employed temperature. The heating is generally carried out over a period of from two to twelve hours or longer, the longer reacting time being employed at the lower temperatures. The mixture may be heated under reduced pressure to facilitate the removal of alkyl chloride from the reaction zone. Following the reaction, the desired product may be separated in the previously described manner.

The following examples illustrate the invention but are not to be construed as limiting the same.

*Example 1*

7.85 grams (0.02 mole) of bis(tetramethyldiamidophosphoric) dimethylamidophosphoric dianhydride, and 5.4 grams (0.03 mole) of hexamethylphosphoramide were mixed together and the resulting dispersion heated with agitation for five hours at 150° C. Upon completion of the reaction, the mixture was distilled under reduced pressure at gradually increased temperatures up to a temperature of 170° C. to separate low boiling constituents and to contain as a residue an octamethylpyrophosphoramide product having a molecular weight of 283 as compared to a theoretical molecular weight of 286. Octamethylpyrophosphoramide is an oily liquid having a boiling point of 139° to 140° C. at 1.5 milliliters pressure and a refractive index $n/D$ of 1.4620 at 25° C.

*Example 2*

6.65 grams (0.04 mole) of O-methyl tetramethyldiamidophosphate (having a density of 1.0647 and a refractive index $n/D$ of 1.4385 at 20° C.), 3.25 grams (0.02 mole) of dimethylamidophosphoric dichloride (having a density of 1.3502 and a refractive index $n/D$ of 1.4640 at 20° C.) and 5.4 grams (0.02 mole) of hexamethylphosphoramide were mixed together and the resulting dispersion heated at a temperature of 150° C. until the evolution of methyl chloride of reaction was substantially complete. The heating was carried out with stirring and over a period of about five hours. During the heating, methyl chloride was separated and recovered from the reaction zone as formed. Upon completion of the reaction, the mixture was distilled under reduced pressure at gradually increased temperatures up to a temperature of 170° C. to separate low boiling constituents and to obtain an octamethylpyrophosphoramide product as a residue. When the latter product is fractionated in a molecular still, substantially pure octamethylpyrophosphoramide is obtained.

*Example 3*

6.8 (0.04 mole) of tetramethyldiamidophosphoric chloride (having a density of 1.1823 and a refractive index $n/D$ of 1.4670 at 20° C.), 3.65 grams (0.02 mole) of O,O-diethyl dimethylamidophosphate (having a density of 1.1117 and a refractive index $n/D$ of 1.4200 at 20° C.) and 5.4 grams (0.03 mole) of hexamethylphosphoramide were mixed together and the resulting dispersion heated at a temperature of 150° C. until no further substantial amounts of ethyl chloride of reaction were liberated. The heating was carried out with stirring and over a period of about five hours. During the heating, gaseous ethyl chloride was separated and recovered from the reaction zone as formed. Upon completion of the reaction, the mixture was distilled under reduced pressure at gradually increased temperatures up to a temperature of 170° C. to separate low boiling constituents and to obtain an octamethylphosphoramide product as a residue. Upon fractionation in a molecular still, the latter product yields substantially pure octamethylpyrophosphoramide.

In a similar manner other octaalkylpyrophosphoramides may be prepared as follows:

Octaisopropylpyrophosphoramide by heating a mixture of O-butyl tetraisopropyldiamidophosphate, diisopropylamidophosphoric dichloride and hexaisopropylphosphoramide.

Octaethylpyrophosphoramide by heating a mixture of tetraethyldiamidophosphoric chloride, O,O-dibutyl diethylamidophosphate and hexaethylphosphoramide.

Octabutylpyrophosphoramide by heating a mixture of tetrabutyldiamidophosphoric chloride, O,O-dimethyl dibutylamidophosphate and hexabutylphosphoramide.

Octaethylpyrophosphoramide by heating a mixture of O-ethyl tetraethyldiamidophosphate, diethylamidophosphoric dichloride and hexaethylphosphoramide.

Octabutylpyrophosphoramide by heating a mixture of bis(tetrabutyldiamidophosphoric) dibutylamidophosphoric dianhydride and hexabutylphosphoramide.

Octaethylpyrophosphoramide by heating a mixture of bis(tetraethyldiamidophosphoric(diethylamidophosphoric dianhydride and hexaethylphosphoramide.

The octaalkylpyrophosphoramides as prepared in accordance with the present invention are oily liquids somewhat soluble in many organic solvents and water. They are of value as intermediates for the preparation of other phosphate derivatives and as toxic constituents of parasiticide compositions. Their use for combatting insect pests is disclosed in U. S. Patent No. 2,502,966.

I claim:

1. A process for the manufacture of a pyrophosphoramide of the formula

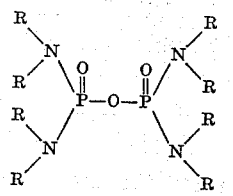

which comprises subjecting a bis(tetraalkyldiamidophosphoric) dialkylamidophosphoric dianhydride of the formula

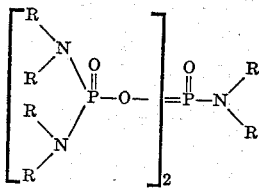

to a temperature of from 135° to 190° C. while admixed with a hexaalkylphosphoramide of the formula

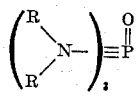

the symbol R in the above formulae representing an alkyl radical containing from 1 to 4 carbon atoms, inclusive.

2. A process for the manufacture of a pyrophosphoramide of the formula

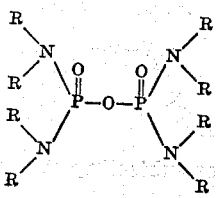

which comprises subjecting one molecular proportion of a bis (tetraalkyldiamidophosphoric) dialkylamidophosphoric dianhydride of the formula

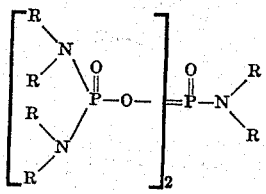

to a temperature of from 135° to 190° C. while admixed with at least one molecular proportion of a hexaalkylphosphoramide of the formula

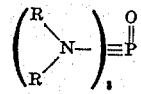

the symbol R in the above formulae representing an alkyl radical containing from 1 to 4 carbon atoms, inclusive.

3. A process for the manufacture of a pyrophosphoramide of the formula

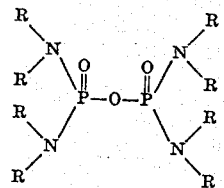

which comprises subjecting at least two molecular proportions of a diamido compound of the formula

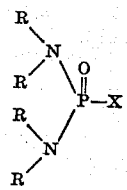

and one molecular proportion of a monoamido compound of the formula

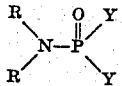

to a temperature of from 135° to 190° C. while admixed with at least one molecular proportion of a hexaalkylphosphoramide of the formula

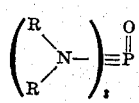

in which formulae X is a member of the group consisting of chlorine and R'—O— and Y is the other member of said group, and R and R' each represent an alkyl radical containing from 1 to 4 carbon atoms, inclusive.

4. A process for the manufacture of a pyrophosphoramide of the formula

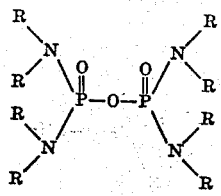

which comprises subjecting at least two molecular proportions of a tetraalkyldiamidophosphoric chloride of the formula

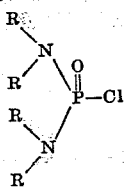

and one molecular proportion of an O,O-dialkyl dialkylamidophosphate of the formula

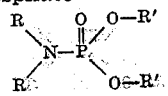

to a temperature of from 135° to 190° C. while admixed with at least one molecular proportion of a hexaalkylphosphoramide of the formula

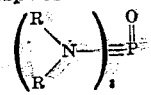

the symbols R and R' in the above formulae each representing an alkyl radical containing from 1 to 4 carbon atoms, inclusive.

5. A process for the manufacture of a pyrophosphoramide of the formula

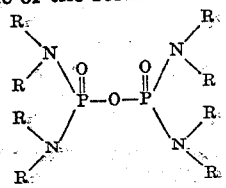

which comprises subjecting at least two molecular proportions of an O-alkyl tetraalkyldiamidophosphate of the formula

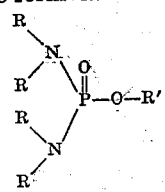

and one molecular proportion of a dialkylamidophosphoric dichloride of the formula

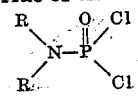

to a temperature of from 135° to 190° C. while admixed with at least one molecular proportion of a hexaalkylphosphoramide of the formula

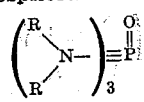

the symbols R and R' in the above formulae each representing an alkyl radical containing from 1 to 4 carbon atoms, inclusive.

6. A process for the manufacture of octamethylpyrophosphoramide which comprises subjecting at least two molecular proportions of O-methyl tetramethyldiamidophosphate of the formula

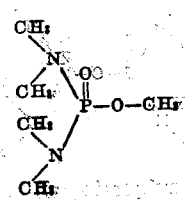

and one molecular proportion of dimethylamidophosphoric dichloride of the formula

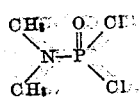

to a temperature of from 135° to 190° C. while admixed with at least one molecular proportion of hexamethylphosphoramide of the formula

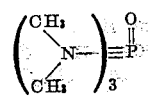

7. A process for the manufacture of octamethylpyrophosphoramide which comprises subjecting at least two molecular proportions of tetramethyldiamidophosphoric chloride of the formula

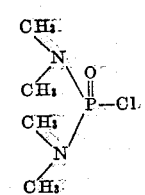

and one molecular proportion of O,O-diethyl dimethylamidophosphate of the formula

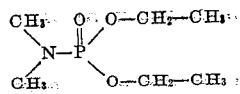

to a temperature of from 135° to 190° C. while admixed with at least one molecular proportion of hexamethylphosphoramide of the formula

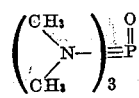

8. A process for the manufacture of octamethylpyrophosphoramide which comprises subjecting one molecular proportion of bis(tetramethyldiamidophosphoric) dimethylamidophosphoric dianhydride of the formula

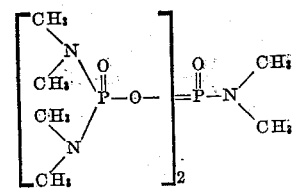

to a temperature of from 135° to 190° C. while admixed with at least one molecular proportion of hexamethylphosphoramide of the formula

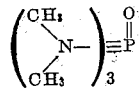

9. A process for the manufacture of a pyrophosphoramide of the formula

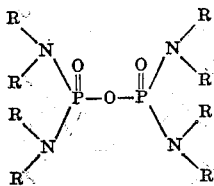

which comprises subjecting to a temperature of from 135° to 190° C. a hexaalkylphosphoramide of the formula

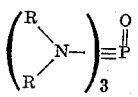

while admixed with a reagent from the group consisting of (1) a bis(tetraalkyldiamidophosphoric) dialkylamidophosphoric dianhydride of the formula

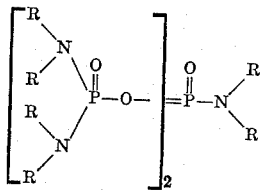

and (2) a mixture of a diamido compound of the formula

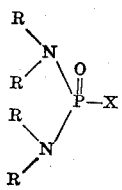

and a monoamido compound of the formula

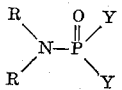

in the molecular proportion of at least 2 moles of the diamido compound to 1 mole of the monoamido compound, X being a member of the group consisting of chlorine and R'—O—, Y being the other member of the latter group and R and R' each representing an alkyl radical containing from 1 to 4 carbon atoms, inclusive.

HENRY TOLKMITH.

No references cited.